June 10, 1941.  E. H. PIRON  2,245,295
CYLINDRICAL SPRING
Filed Dec. 23, 1938
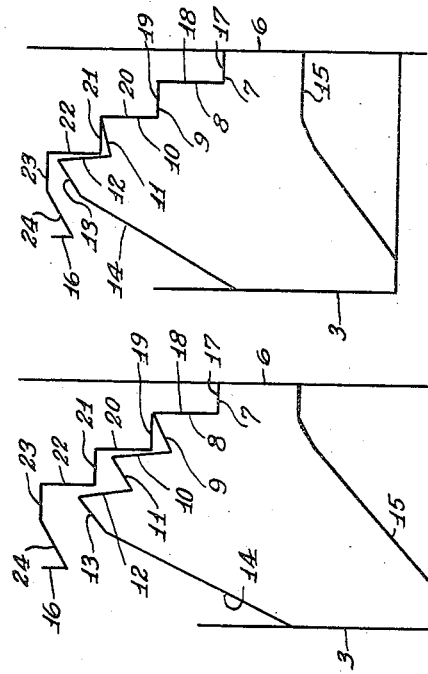
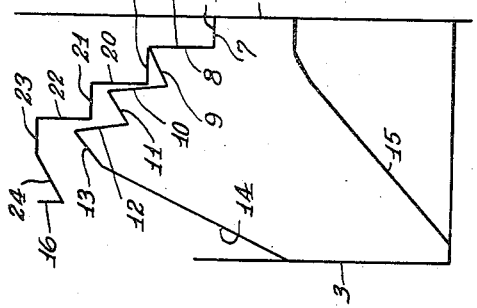
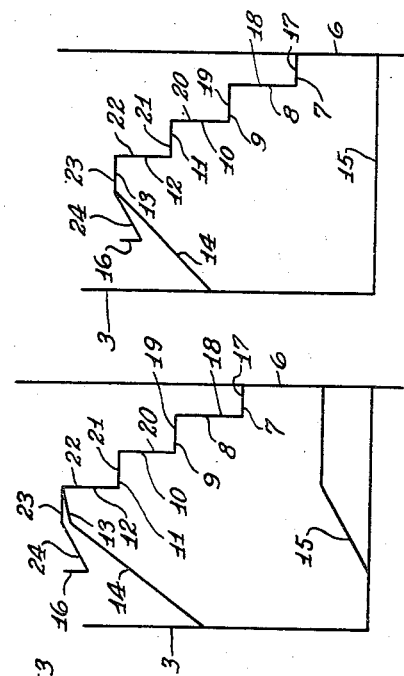
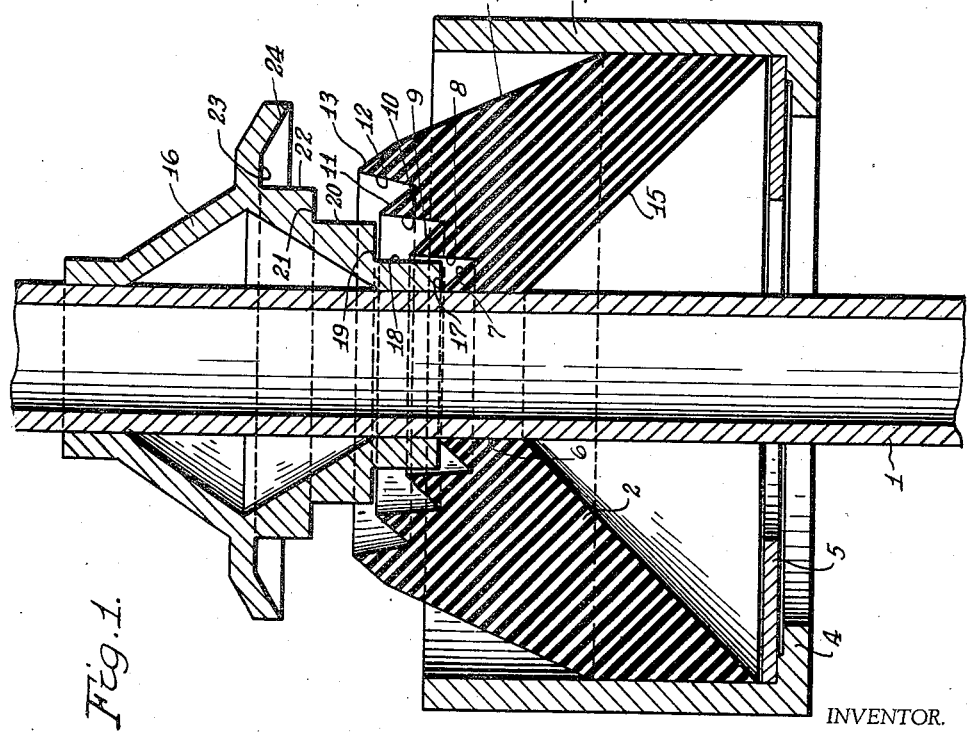
INVENTOR.
Emil H. Piron
BY
ATTORNEY.

Patented June 10, 1941

2,245,295

UNITED STATES PATENT OFFICE 2,245,295

CYLINDRICAL SPRING

Emil H. Piron, New York, N. Y., assignor to Transit Research Corporation, a corporation of New York Application December 23, 1938, Serial No. 247,437

26 Claims. (Cl. 267—63)

This invention relates to springs and has for its primary object to provide a spring having an elastic springing medium in which distortions resulting from loading consist of a combination of compression, shear and bending strains.

Another object is to provide an elastic spring in which the main deflections are in shear and bending while its support and loading are produced by compressive means.

Another object is to provide an elastic spring embodying means for limiting distortion of the elastic material in the loading region when such loading reaches a safe value.

Another object is to provide an elastic spring embodying a plurality of individual load receiving regions and means for limiting distortion of the elastic material in each region successively as a function of the application of loads thereto. As the first region is subjected to a safe load it becomes stabilized against further distortion, following which a second region is subjected to an added load and becomes stabilized when that added load reaches a predetermined safe value. The remaining regions function in like manner, with the result that the typical load deflection curve of an elastic shear spring may be altered to obtain softness under light loads and increasing stiffness under increasing loads.

Another object of the invention is to provide an elastic spring embodying stepped load receiving regions and a stepped load imposing member adapted to contact and apply the load to the load receiving steps consecutively as the spring deflects in the presence of loading.

A further and important object is to provide a spring embodying an elastic plastic in which stresses are imposed, as above described, by metallic elements and in which the usual difficulties of surface bonding the plastic to metallic elements are obviated.

Other objects and advantages will become more fully apparent as reference is had to the accompanying drawing wherein my invention is illustrated, and in which:

Fig. 1 is a longitudinal section of my improved spring, and

Figs. 2, 3, 4 and 5 are diagrams, each illustrating deflections resulting at different stages in the loading thereof.

Referring first to Fig. 1, I designates a shaft of metal or its equivalent, surrounded by an elastic plastic springing element 2 of rubber or its equivalent. The element 2 is, generally, frusto-conical at its top and bottom surfaces 14 and 15 and has its outer, peripheral portion supported in a metal cylinder 3. Beneath the element 2, the cylinder 3 is formed with an internal flange 4, upon which a ring 5 is seated for limiting deflection of the element 2.

The element 2 has a cylindrical internal periphery 6 in contact with the central load imposing member I for a portion of its axial length and from the portion 6 to its top surface 14, a plurality of steps 7, 9, 11 and 13 are formed. Each step is of downwardly enlarging frusto-conical shape, and the risers or surfaces between respective steps, designated 8, 10 and 12, are of upwardly enlarging frusto-conical form.

Secured upon the shaft I is a load imposing member 16 having a number of steps or progressive cylinders of increasing diameter corresponding in number to the number of conical steps on the spring. The steps or surfaces connecting the cylinders are designated 17, 19, 21 and 23, respectively, and the risers between said steps or cylinders proper are respectively designated 18, 20 and 22.

In Fig. 1 the spring is shown in an unloaded position, with the load imposing steps 17, 19, 21 and 23 disposed vertically above the load receiving steps 7, 9, 11 and 13 respectively. During the first stage of loading, as illustrated in Fig. 2, the load imposing step 17 contacts the first step 7, causing deflection of the step 7 and also causing deflection of the whole spring. The conical step 7 is deflected until the step 17 completely contacts the entire area thereof, and the loads are, therefore, substantially equally distributed on said step. During this deflection of the spring, the opening defined by the upwardly enlarging conical surface 8 decreases its slope into a cylindrical form and comes in contact with the first cylindrical surface 18 of the load imposing member. At this stage in the loading of the spring the load imposing step 19 has moved to a position where the load just starts being applied on the top edge of the load receiving step 9, as indicated in Fig. 2.

As the load increases during the second stage shown in Fig. 3 the spring deflects further, the load imposing step 19 deforms the load receiving step 9 and the two steps come into complete contact. At this time reactions are evenly distributed between the two steps 19 and 9, and the surface 10 which previously was conical is distorted to cylindrical shape and applies equally on the cylindrical surface 20 of the load imposing member. The load imposing step 21 is at this time moved into initial contact with the load receiving step 11. There have been no further distortions in the first step of the spring hence the reactions therein are stabilized and this holds true for each step of the spring after contact with the corresponding steps of the member 1.

During the third stage of loading shown in Fig. 4, the load imposing step 21 deforms the load receiving step 11 and applies equally thereon. The spring deflects further, and the previously conical surface 12 becomes cylindrical and applies on the cylindrical surface 22 of the load imposing member. The load imposing step 23 initially contacts the final load receiving step 13 at the completion of the third stage deflection.

In the final stage of loading, shown in Fig. 5, the load imposing step 23 deforms the load receiving step 13 and applies equally thereon. The lower wall 15 of the spring, which changes its shape progressively during the subsequent loading stages, now resides in a plane extending substantially perpendicular to the axis of the shaft.

Overloading of the spring will finally cause the surface 24 to contact the surface 14, the resistance of the element 2 to loading subsequent to full contact of the surface 15 with the member 5 being wholly by compression.

The initial angularities of the conical steps and risers are chosen to provide load receiving surfaces having areas in selected proportion to the load conditions under which the spring is required to operate. That is to say, the angularities will be different in the case of a spring for heavy duty than they would be in the case of a light duty spring. The angularities and surface areas are determining factors in limiting distortion of the rubber in different regions consecutively, and are made such that distortion is limited when the loading reaches a safe value.

Returning to the first stage of loading, where the steps 17 and 7 are in full contact, and the previously conical surface 8 is in complete contact with the cylindrical surface 18 of the load imposing member, it will be noted that one region of the spring becomes stabilized at this time against further distortion. Assuming that this stabilization takes place while the loading of that region is still of safe value, prevention of further distortion causes stabilization of reactions, and that region of the spring which has received a given load maintains the distribution of its reactions against that load when other loads are added to other regions of the spring.

As increased loads are added, as in the successive stages of loading described above, other regions of the spring are distorted and stabilized successively. The result of this function is that the main deflections of the spring are in shear and bending although its support and loading are produced by compressive means.

While not essential in all cases it is recommended that the area of each step be substantially equal to one-third the shear area of the elastic material immediately therebeneath for the reason that the modulus of elasticity in compression is practically three times as great as in shear so that these proportions should be approximated in order to obtain uniformity of strains throughout the mass.

Although a specific embodiment of the invention has been illustrated and described, it will be understood that various changes may be made within the scope of the appended claims without departing from the spirit of the invention, and such changes are contemplated.

What is claimed is:

1. A spring comprising concentric load imposing and load receiving members having a springing element of elastic plastic therebetween, said element having frusto-conical top and bottom surfaces and cylindrical internal and external peripheries, said internal periphery at its top being substantially spaced from the main top surface of said element with the intervening space comprising at least one step V-shaped in a cross-section taken longitudinally of the spring, the inside one of said members being shaped to contact said internal periphery to contact each of said steps progressively during increasing axial movement thereof with respect to the other of said members.

2. A spring comprising concentric load imposing and load receiving members separated by a springing means composed of a mass of elastic plastic material, said mass having a conical surface portion formed with a series of steps, said members upon relative axial loading movement concentrating the loading on said surface portion of said springing means and coacting therewith to cause said springing means to resist said loading by a combination of compression, shear and bending stresses.

3. A spring comprising concentric load imposing and load receiving members separated by a springing means composed of a mass of elastic plastic material, said mass having a conical surface formed with a series of steps which coact with said members upon relative axial loading movement imposing a combination of shear and bending stresses on said springing means according to a load deflection ratio which increases as the intensity of such movement increases.

4. A spring comprising concentric load imposing and load receiving members separated by a springing means composed of elastic plastic material, said members upon relative axial loading movement imposing a combination of shear and bending stresses on said springing means, the inner of said members and said means being so shaped as to stabilize a progressively increasing area of the top of said springing means against further deflecting movements whereby the load deflection ratio of said spring increases under increasing loading.

5. A spring comprising concentric load imposing and load receiving members separated by a springing means composed of elastic plastic material, said springing means being stepped in a radially outward direction from its internal periphery for a portion of its radial length, the inner of said members contacting said internal periphery and being stepped radially outwardly therefrom, the steps of said inner member being adapted to surface contact progressively the steps of said springing means under increasing loading.

6. A spring comprising concentric load imposing and load receiving members separated by a springing means composed of elastic plastic material, said members upon relative axial loading movement imposing a combination of shear and bending stresses on said springing means according to a load deflection ratio which increases as the intensity of such movement increases, and means limiting the deflection of said springing means in shear and bending, said springing means resisting loading after functioning of said limiting means by compression.

7. A spring comprising concentric load imposing and load receiving members separated by a springing means composed of elastic plastic material, said springing means being stepped in a radially outward direction from its internal periphery for a portion of its radial length, the inner of said members contacting said internal periphery and being stepped radially outwardly therefrom, the steps of said inner member being adapted to surface contact progressively the steps of said springing means under increasing loading, and a stop means active after contact by the last of said steps to contact to cause said springing means to resist all further loading thereon by compression.

8. A spring comprising concentric load imposing and load receiving members separated by a springing means composed of elastic plastic material, said springing means being stepped in a radially outward direction from its internal periphery for a portion of its radial length, the inner of said members contacting said internal periphery and being stepped radially outwardly therefrom, the steps of said inner member and of said springing means being so constructed and arranged that after full surface contact of the riser of a step of said springing means against the corresponding riser of said inner member it is stabilized against further distortion whereby it maintains the distribution of its reactions against said inner member when additional loads are added thereto.

9. A spring comprising concentric load imposing and load receiving members separated by a springing means composed of elastic plastic material, said springing means being stepped in a radially outward direction from its internal periphery for a portion of its radial length, the inner of said members contacting said internal periphery and being stepped radially outwardly therefrom, the steps of said inner member being adapted to surface contact progressively the steps of said springing means under increasing loading, the area of the innermost of said steps being substantially equal to one-third of the shear area of said springing means immediately therebeneath.

10. A spring comprising concentric cylindrical members separated by a mass of elastic plastic material, said members being relatively movable axially to impose shear loading on said material, the outer one of said members being of cup-shape formation with an opening through the bottom thereof through which the other thereof extends, said elastic material having frusto-conical lower and main top surfaces and cylindrical internal and external surfaces, the top surface of said elastic material having a plurality of steps of frusto-conical shape connected by risers also of frusto-conical shape extending from the internal diameter thereof radially outwardly with the last of said steps intersecting said top surface intermediate the length thereof, the inner of said members contacting said elastic material at said internal surface and expanding its shape thereabove in a progression of steps equal in number to those on said plastic material, each normal to the axis of said inner member with the risers therefrom of cylindrical shape, the steps of said inner member progressively surface-contacting the steps of said elastic material under increasing relative axial loading movement of said members.

11. A spring comprising concentric cylindrical members separated by a mass of elastic plastic material, said members being relatively movable axially to impose shear loading on said material, the outer one of said members being of cup-shape formation with an opening through the bottom thereof through which the other thereof extends, said elastic material having frusto-conical lower and main top surfaces and cylindrical internal and external surfaces, the top surface of said elastic material having a plurality of steps of frusto-conical shape connected by risers also of frusto-conical shape extending from the internal diameter thereof radially outwardly with the last of said steps intersecting said top surface intermediate the length thereof, the inner of said members contacting said elastic material at said internal surface and expanding its shape thereabove in a progression of steps equal in number to those on said plastic material, each normal to the axis of said inner member progressively surface-contacting the steps of said elastic material under increasing relative axial loading movement of said members, the lower surfaces of said elastic material becoming flattened against the bottom of said cup as the last of said steps contacts its corresponding step of said inner member.

12. A spring comprising concentric cylindrical members separated by a mass of elastic plastic material, said members being relatively movable axially to impose shear loading on said material, the outer one of said members being of cup-shape formation with an opening through the bottom thereof through which the other thereof extends, said elastic material having frusto-conical lower and main top surfaces and cylindrical internal and external surfaces, the top surfaces of said elastic material having a plurality of steps of frusto-conical shape connected by risers also of frusto-conical shape extending from the internal diameter thereof radially outwardly with the last of said steps intersecting said top surface intermediate the length thereof, the inner of said members contacting said elastic material at said internal surface and expanding its shape thereabove in a progression of steps equal in number to those on said plastic material, each normal to the axis of said inner member progressively surface-contacting the steps of said elastic material under increasing relative axial loading movement of said members, the lower surfaces of said elastic material becoming flattened against the bottom of said cup as the last of said steps contacts its corresponding step of said inner member, said inner member having an additional step which thereafter contacts the top surface of said elastic material to impose loading thereon in compression.

13. An elastic element for a spring comprising a cylindrical mass of elastic plastic material having a central opening therethrough, one surface of said mass being composed of two reverse frusto cones, one of said cones being substantially shallower than the other and stepped.

14. An elastic element for a spring comprising a cylindrical mass of elastic plastic material having a central opening therethrough, one surface of said mass being of frusto-conical shape for a portion of its length and having a series of steps extending from the top rim thereof to said opening, each of said steps being of V-shape in any cross-section taken radially of said mass.

15. An elastic element for a spring comprising a cylindrical mass of elastic plastic material having a central opening therethrough, one surface of said mass being frusto-conical, the other surface thereof being of frusto-conical shape for a portion of its length and having a series of steps extending from the top rim thereof to said opening, each of said steps being of V-shape in any cross-section taken radially of said mass.

16. A spring comprising concentric cylindrical load imposing and load receiving members separated by a springing element composed of a mass of elastic plastic material having cylindrical inside and outside surfaces contacting the outside and inside surfaces respectively of said load imposing and load receiving members, said mass having generally conical top and bottom surfaces, one of said latter surfaces having steps therein, and deflection limiting means on one of said members for cooperation with said steps.

17. A rubber springing element composed of a mass of elastic plastic material having concentric cylindrical inner and outer surfaces and generally conical top and bottom surfaces, one of said latter surfaces having steps formed therein for cooperation with deflection limiting means.

18. A spring comprising load imposing and load receiving members separated by a springing means composed of elastic plastic material having a surface portion formed with at least one step, said members upon initial relative movement under axial loading imposing a combination of shear and bending stresses on said springing means and upon subsequent relative movement under axial loading imposing compression stresses on that portion of said springing means covered by said step while continuing to impose a combination of shear and bending stresses on the remainder thereof.

19. A spring comprising concentric load imposing and load receiving members separated by a springing means composed of a mass of elastic plastic material, said mass having a conical surface formed with a series of steps which coact with said members upon relative axial loading movement imposing a combination of compression, shear and bending stresses on said springing means according to a load deflection ratio which increases as the intensity of such movement increases.

20. A spring comprising concentric load imposing and load receiving members separated by a springing means composed of elastic plastic material, said members upon relative axial loading movement imposing a combination of compression, shear and bending stresses on said springing means, the inner of said members and said means being so shaped as to stabilize a progressively increasing area of the top of said springing means against further deflecting movements whereby the load deflection ratio of said spring increases under increasing loading.

21. A spring comprising load imposing and load receiving members separated by a springing means composed of elastic plastic material, said members upon relative loading movement imposing a combination of shear and bending stresses on said springing means, and means limiting the deflection of said springing means in shear and bending, said springing means resisting loading after functioning of said limiting means by compression.

22. A spring comprising load imposing and load receiving members separated by a springing means composed of elastic plastic material, said members upon relative loading movement imposing a combination of shear and bending stresses on said spring means, and means limiting the deflection of said springing means in shear and bending, said springing means thereafter resisting loading almost entirely by compression.

23. An elastic element for a spring comprising a mass of elastic plastic material having a central opening therethrough, one surface of said mass comprising two relatively angularly disposed surfaces one of which is stepped.

24. An elastic element for a spring comprising a cylindrical mass of elastic plastic material having a central opening therethrough, one surface of said mass being composed of two reverse frusto cones, one of said cones being substantially shallower than the other and stepped, and the other surface of said mass having a conical recess extending axially thereinto.

25. In a spring, load imposing and load receiving members, an elastic plastic mass adapted to receive the load from the load imposing member and transmit it to a load receiving member in such manner that in a section of the spring extending from the load receiving member to the load imposing member and normal thereto the resultant of the loading forces is parallel to and offset from the resultant of the supporting forces, the mass being so formed as to resist these forces in compression, bending and shear, and the load imposing and load supporting members being so formed that the distance between the two said resultants decreases as the load increases.

26. A springing element comprising a cylindrical body of rubber-like material having a central opening therethrough, said body having one end face thereof formed with at least one step therein, said step being of V-shape in any cross section taken radially of the element with one branch of the V extending to one periphery of said element and the other branch being substantially parallel to the axis thereof.

EMIL H. PIRON.